United States Patent
Yano et al.

(10) Patent No.: US 8,817,881 B1
(45) Date of Patent: Aug. 26, 2014

(54) VIDEO PROCESSING APPARATUS AND VIDEO PROCESSING METHOD

(71) Applicant: Sony Corporation, Tokyo (JP)

(72) Inventors: Koji Yano, Tokyo (JP); Yuji Fujimoto, Kanagawa (JP); Junichiro Enoki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/187,647

(22) Filed: Feb. 24, 2014

(51) Int. Cl.
*H04N 7/12* (2006.01)
*H04N 11/02* (2006.01)
*H04N 11/04* (2006.01)

(52) U.S. Cl.
USPC ....... 375/240.16; 348/584; 348/598; 348/564

(58) Field of Classification Search
CPC ............. H04N 21/23614; H04N 21/4316; H04N 21/812; H04N 19/00545; H04N 19/00884; H04N 19/00369; H04N 19/00569; H04N 19/00684; H04N 19/00781; H04N 19/00272; H04N 19/00024; H04N 19/00278; H04N 19/00769; H04N 19/00151
USPC ............... 375/240.1, 240.12, 240.13, 240.14, 375/240.15, 240.16; 348/584, 598, 578, 348/585, 563–565, 403, 416, 426, 392, 423
IPC .................................. H04N 7/12, 11/02, 11/04
See application file for complete search history.

(56) References Cited

U.S. PATENT DOCUMENTS

| | | | | |
|---|---|---|---|---|
| 5,414,469 A | * | 5/1995 | Gonzales et al. | ......... 375/240.18 |
| 5,764,277 A | * | 6/1998 | Loui et al. | ................... 348/14.01 |
| 5,812,791 A | * | 9/1998 | Wasserman et al. | .......... 709/247 |
| 6,141,062 A | * | 10/2000 | Hall et al. | ...................... 348/584 |
| 6,147,695 A | * | 11/2000 | Bowen et al. | ................. 345/503 |
| 7,031,317 B2 | | 4/2006 | Negishi et al. | |
| 7,492,387 B2 | * | 2/2009 | Yang et al. | ................. 348/14.09 |

FOREIGN PATENT DOCUMENTS

JP 2002-064818 A 2/2002

* cited by examiner

*Primary Examiner* — Trang U Tran
(74) *Attorney, Agent, or Firm* — Lerner, David, Littenberg, Krumholz & Mentlik, LLP

(57) ABSTRACT

A video processing apparatus includes a combining unit that combines encoded streams of a plurality of videos to generate an encoded stream of a multiple-video image composed of the videos, each encoded stream of each video having coding units in each horizontal line that are encoded as a slice, and an insertion unit that inserts an insertion stream into the encoded stream of the multiple-video image generated by the combining unit when a view area of the multiple-video image is moved. The insertion stream is an encoded stream in which all the coding units in the multiple-video image are replaced with skip macroblocks with a motion vector indicating a direction and an amount of movement of the view area.

8 Claims, 14 Drawing Sheets

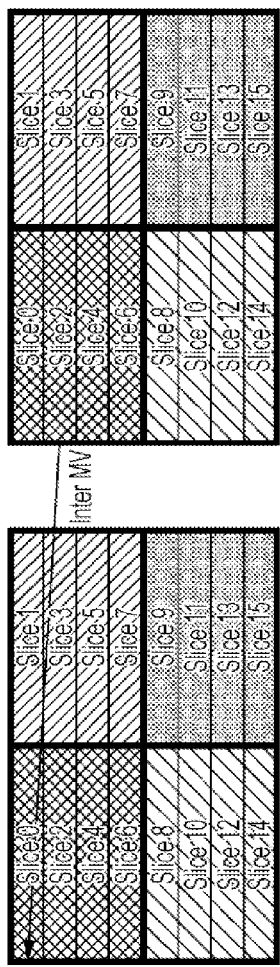
FIG. 11A
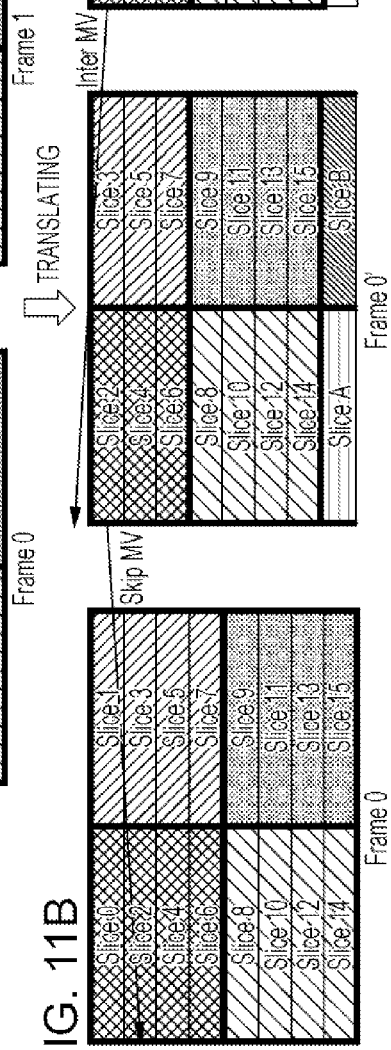
FIG. 11B
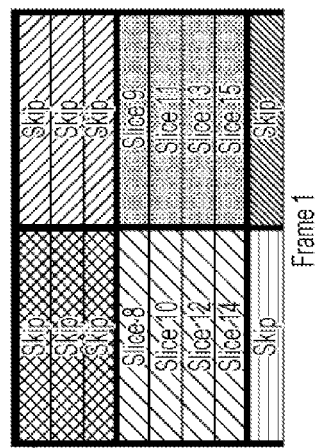
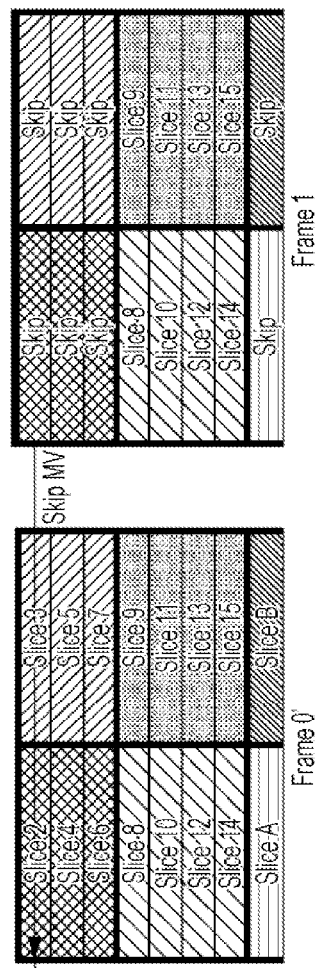
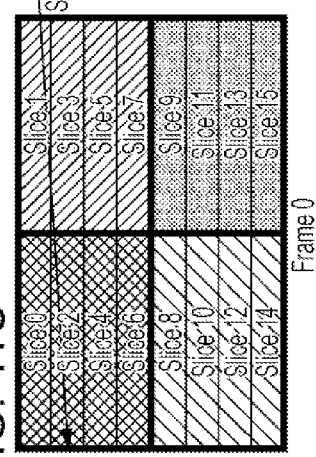
FIG. 11C

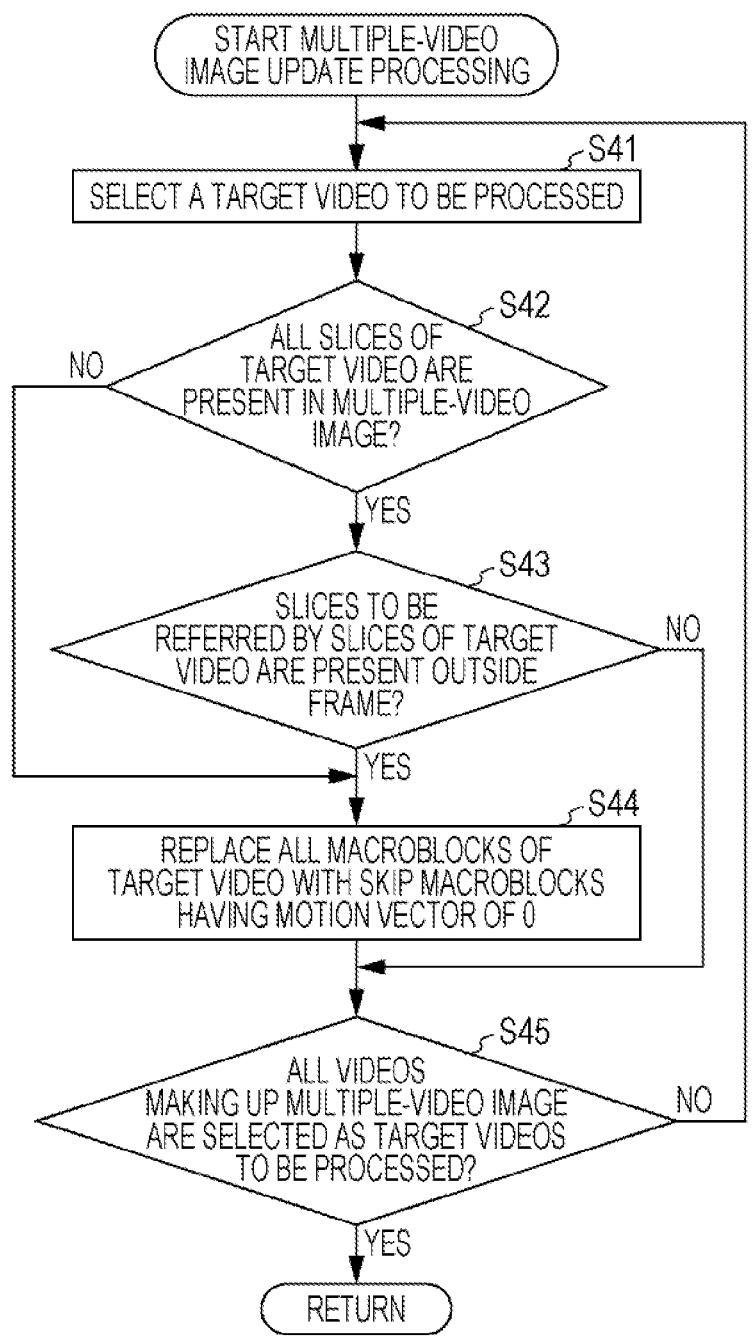

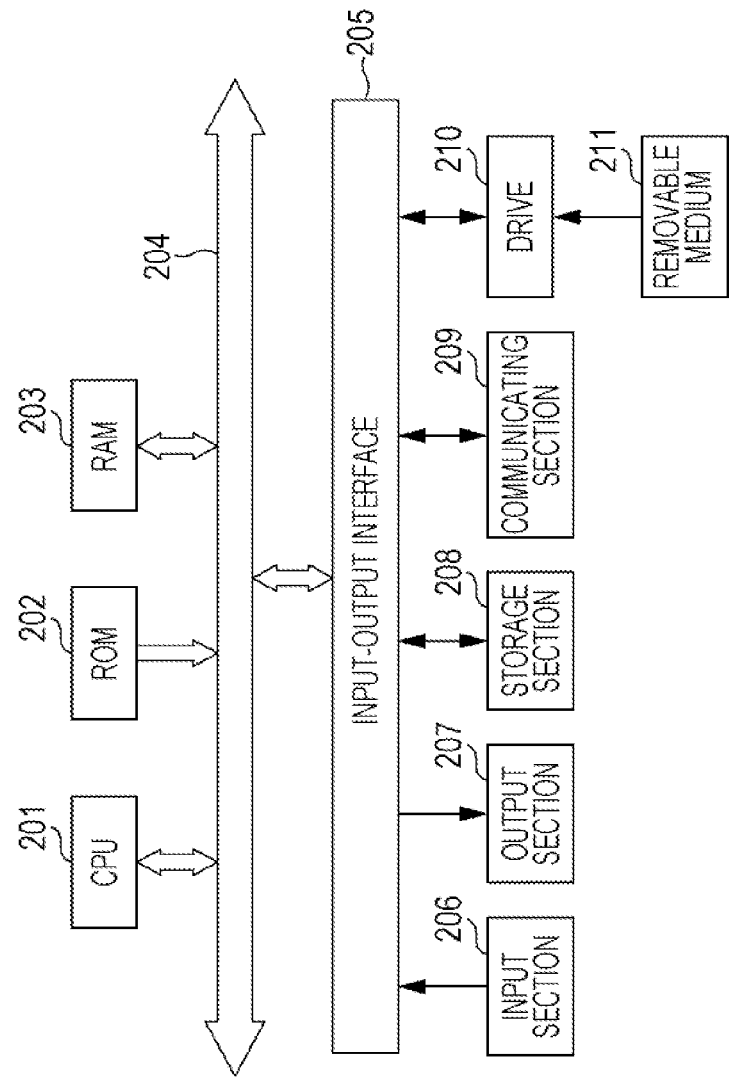

VIDEO PROCESSING APPARATUS AND VIDEO PROCESSING METHOD

CROSS REFERENCE TO RELATED APPLICATIONS

This application claims the benefit of Japanese Priority Patent Application JP 2013-046836 filed Mar. 8, 2013, the entire contents of which are incorporated herein by reference.

BACKGROUND

The present disclosure relates to video processing apparatuses and video processing methods and, more particularly, to a video processing apparatus and a video processing method configured to reduce the processing load caused by movement of a view area of a multiple-video image.

Due to progress in content digitization and the development of a video transmission infrastructure, video distribution through the Internet is spreading. Recently, in addition to personal computers, network-connectable television receivers have been increasing as reception side devices, and therefore it has become possible to view distributed videos on a television receiver. Furthermore, the recent development of cloud services has made it possible to provide various channels including private contents to viewers via a network. Thus, there has been an increasing demand for a multiple-video reproduction system that allows viewers to simultaneously watch a plurality of videos as shown in FIG. 1 in order to allow the viewers to easily search for a preferred video to watch.

In the multiple-video reproduction system of FIG. 1, a multiple-video image displayed on a screen is composed of a plurality of videos. Among the videos displayed, a main video that is supposed to be mainly viewed is arranged at the center of the screen in a maximum size. Around the main video, selectable (switchable) videos are arranged in sizes smaller than that of the main video. The selectable videos are, for example, TV broadcasting channels, Web screens, video contents of movies and the like, and TV chat screens, and are obtained, for example, from within a cloud (network).

Among methods for displaying such a multiple-video image, a first method employs servers in the cloud that distributes a plurality of encoded streams associated with a plurality of videos, respectively. A client apparatus receives and decodes the encoded streams and performs combination processing on the decoded streams so as to generate a multiple-video image. By way of example, Japanese Unexamined Patent Application Publication No. 2002-064818 discloses a multiple-video image that is formed by receiving a plurality of elementary streams (ESs) and assigning a larger view area to the ES in order of decreasing precedence starting from higher priority ESs on a basis of the display priority of the ESs.

However, distribution of the plurality of encoded streams involves a substantially wide transmission band. Also, it is necessary for client apparatuses to have the capabilities of simultaneously decoding the encoded streams and of performing combination processing on the decoded streams, which makes the client apparatuses expensive.

As a second method for displaying a multiple-video image, there is a method in which a server generates a multiple-video image in the form of a single encoded stream and delivers the stream as illustrated in FIG. 2. In this case, the server decodes a plurality of videos to be combined, resizes the videos, combines the videos, and then re-encodes the combined videos so as to generate an encoded stream of a multiple-video image. These processes put a substantially large processing load on the server.

SUMMARY

When a view area of the multiple-video image is moved by scrolling or other operations, the server has to decode the encoded stream of the multiple-video image, change the motion vector, and re-encode the decoded stream. These processes also put a large processing load on the server.

The present disclosure has been made in view of these circumstances and enables reduction of the processing load caused by movement of the view area of the multiple-video image.

A video processing apparatus according to one embodiment of the present disclosure includes a combining unit that combines encoded streams of a plurality of videos in order to generate an encoded stream of a multiple-video image composed of the videos, each encoded stream of each video having coding units in each horizontal line that are encoded as a slice. The video processing apparatus also includes an insertion unit that inserts an insertion stream into the encoded stream of the multiple-video image generated by the combining unit when a view area of the multiple-video image is moved, and the insertion stream is an encoded stream in which all the coding units in the multiple-video image are replaced with skip macroblocks with a motion vector indicating a direction and an amount of movement of the view area.

A video processing method according to an embodiment of the present disclosure is associated with the video processing apparatus according to the above-described embodiment of the present disclosure.

The video processing method in the embodiment of the present disclosure includes combining encoded streams of a plurality of videos in order to generate an encoded stream of a multiple-video image composed of the videos, each encoded stream of each video having coding units in each horizontal line that are encoded as a slice. The video processing method also includes inserting an insertion stream into the encoded stream of the multiple-video image generated by the combining unit when a view area of the multiple-video image is moved, and the insertion stream is an encoded stream in which all the coding units in the multiple-video image are replaced with skip macroblocks with a motion vector indicating a direction and an amount of movement of the view area.

According to the embodiments of the present disclosure, the processing load caused by movement of a view area of a multiple-video image can be reduced.

BRIEF DESCRIPTION OF THE DRAWINGS

FIGS. 11A, 11B, and 11C illustrate an update of a frame-based encoded stream of a multiple-video image;

FIG. 13 is a flowchart illustrating details of multiple-video image update processing in FIG. 12; and FIG. 14 is a block diagram illustrating an exemplary hardware configuration of a computer.

DETAILED DESCRIPTION OF EMBODIMENTS

Embodiment

Figure 1:
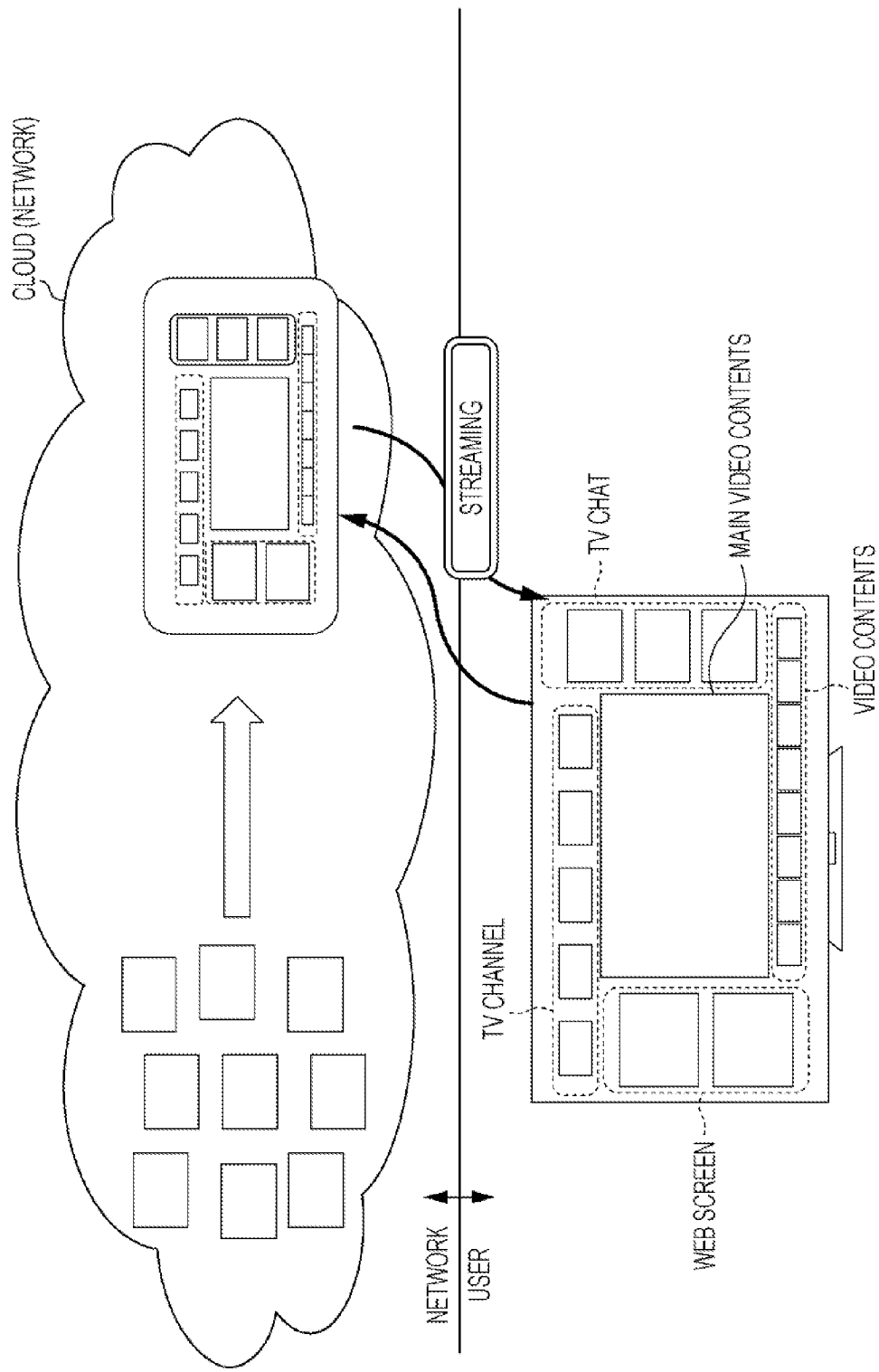
FIG. 1 illustrates a multiple-video reproduction system.
Figure 2:
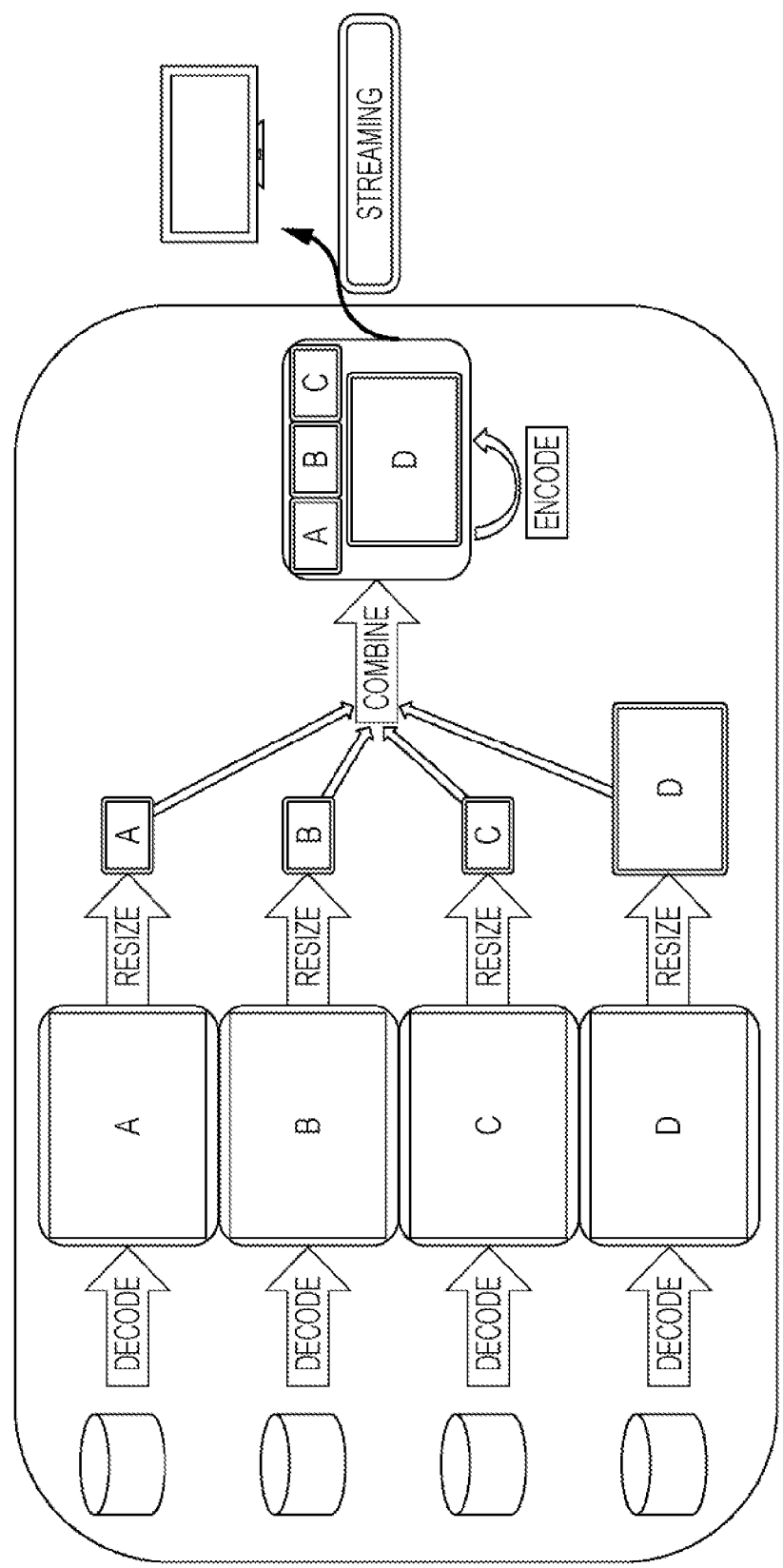
FIG. 2 illustrates an example of a method for distributing an encoded stream of a multiple-video image.
Figure 3:
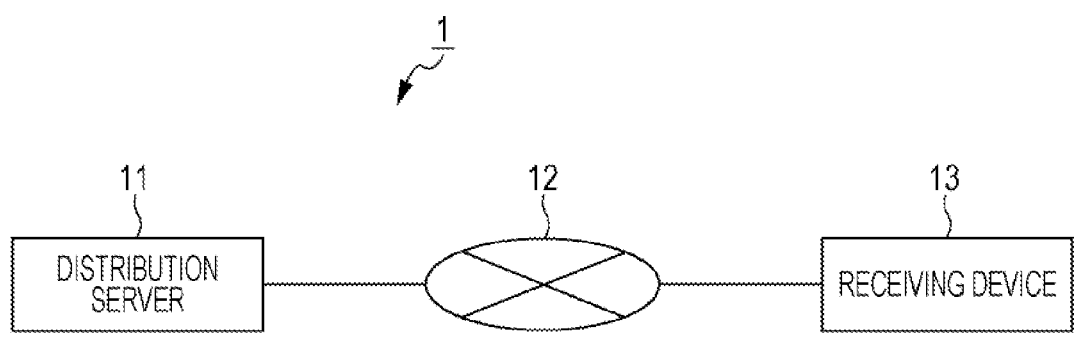
FIG. 3 is an exemplary configuration of a multiple-video reproduction system, to which the present technology is applied, according to an embodiment.

Exemplary Configuration of Multiple-Video Reproduction System According to Embodiment FIG. 3 shows an exemplary configuration of a multiple-video reproduction system, to which the present technology is applied, according to an embodiment.

A multiple-video reproduction system 1 functions as a video processing apparatus and includes a distribution server 11 for distributing videos and a receiving device 13 connected to the distribution server 11 via a network 12. The multiple-video reproduction system 1 distributes an encoded stream of a multiple-video image composed of a plurality of videos to display the multiple-video image.

Specifically, a plurality of frame-based encoded streams of videos are input from outside sources to the distribution server 11 of the multiple-video reproduction system 1. The distribution server 11 selects a plurality of encoded streams of videos to be displayed from the input encoded streams of the videos on the basis of history of movement information that indicates the direction and amount of movement of a view area and is transmitted from the receiving device 13. The distribution server 11 combines the selected encoded streams of videos on a frame by frame basis to generate a frame-based encoded stream of a multiple-video image.

If the amount of movement indicated by the movement information is 0, the distribution server 11 transmits the frame-based encoded stream of the multiple-video image as a combined stream without changes to the receiving device 13.

On the other hand, if the amount of movement indicated by the movement information is anything other than 0, the distribution server 11 generates, based on the movement information, an encoded stream of an insertion video, which is associated with the encoded stream of the multiple-video image and is a frame of a multiple-video image to be inserted between frames of the multiple-video image. The generated encoded stream of the insertion video is referred to as an insertion stream. Then, the distribution server 11 inserts the insertion stream into the frame-based encoded stream of the multiple-video image and transmits it as a combined stream to the receiving device 13.

The receiving device 13 receives the combined stream transmitted by the distribution server 11 via the network 12 such as the Internet. The receiving device 13 decodes the received combined stream and displays the resultant multiple-video image and insertion video image on a built-in liquid crystal display or other types of display.

After starting to display the multiple-video image, the receiving device 13 generates movement information in response to the user's operation, such as scrolling and cursor movement, and transmits the generated movement information to the distribution server 11. Thus, when the amount of movement is anything other than 0, the encoded streams of the videos to be displayed are changed and accordingly the view area is shifted.

The receiving apparatus 13 does not have to include a liquid crystal display, and may instead display the multiple-video image on a display device connected thereto. In addition, the receiving device 13 can be, for example, a television receiver having a network connecting function, a set top box (STP), a personal computer, or a portable terminal device.

The network 12 can be configured so as to be connected to a plurality of receiving devices 13. In this case, the distribution server 11 multicasts a combined stream to the receiving devices 13.

[Exemplary Configuration of Distribution Server]

Figure 4:
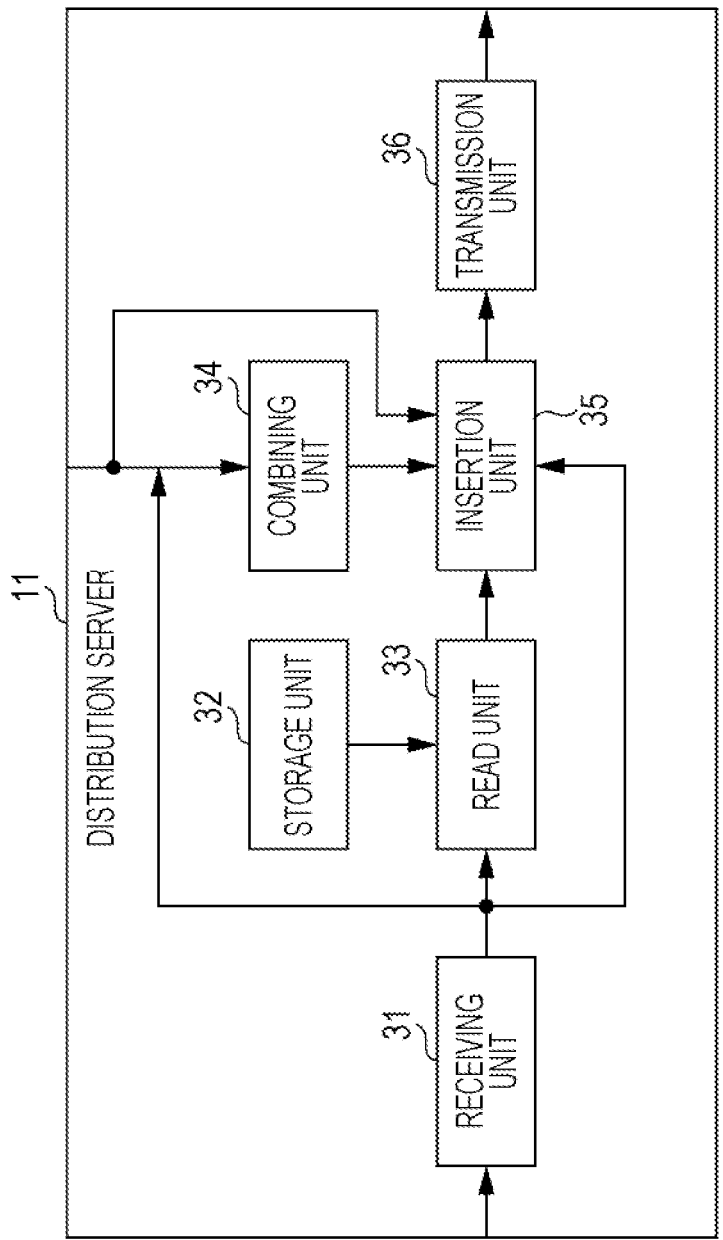
FIG. 4 is a block diagram illustrating an exemplary configuration of the distribution server in FIG. 3.

FIG. 4 is a block diagram illustrating an exemplary configuration of the distribution server 11 in FIG. 3.

As shown in FIG. 4, the distribution server 11 includes a receiving unit 31, a storage unit 32, a read unit 33, a combining unit 34, an insertion unit 35, and a transmission unit 36.

The receiving unit 31 of the distribution server 11 receives movement information transmitted from the receiving device 13 via the network 12 shown in FIG. 3, and supplies the movement information to the read unit 33, combining unit 34, and insertion unit 35. The storage unit 32 stores insertion streams associated with the movement information indicating amounts of movement other than 0.

The read unit 33 reads out an insertion stream associated with the movement information from the storage unit 32 on the basis of the movement information supplied from the receiving unit 31, and supplies the insertion stream to the insertion unit 35.

The combining unit 34 selects a plurality of encoded streams of videos to be displayed from a plurality of encoded streams of videos input from outside sources based on the history of the movement information supplied from the receiving unit 31. The combining unit 34 combines the encoded streams of the selected videos on a frame by frame basis and supplies the frame-based encoded stream of the resultant multiple-video image to the insertion unit 35.

When an insertion stream is supplied from the read unit 33 or, that is, when the amount of movement is anything other than 0, the insertion unit 35 updates slice data of the insertion stream with the use of the frame-based encoded stream of a predetermined video that is input from an outside source on the basis of the movement information. The insertion unit 35 inserts the insertion stream into the frame-based encoded stream of the multiple-video image supplied from the combining unit 34.

During insertion, the insertion unit 35 changes (generates) the slice header of the insertion stream on the basis of the slice header of the frame-based encoded stream, which is placed immediately after the insertion stream, of the multiple-video image. The insertion unit 35 also changes the slice header of the encoded stream of the multiple-video image after the insertion stream.

In addition, the insertion unit 35 supplies the frame-based encoded stream of the multiple-video image with the insertion stream having been inserted, which is regarded as a combined stream, to the transmission unit 36.

On the other hand, when the insertion stream is not supplied from the read unit 33 or, that is, when the amount of movement is 0, the insertion unit 35 supplies a frame-based encoded stream of a multiple-video image, which is regarded as a combined stream, to the transmission unit 36.

The transmission unit 36 transmits the combined stream, which is supplied from the insertion unit 35, to the receiving device 13 via the network 12 shown in FIG. 3.

[Description on Generation of Frame-Based Encoded Stream of Multiple-Video Image]

Figure 5:
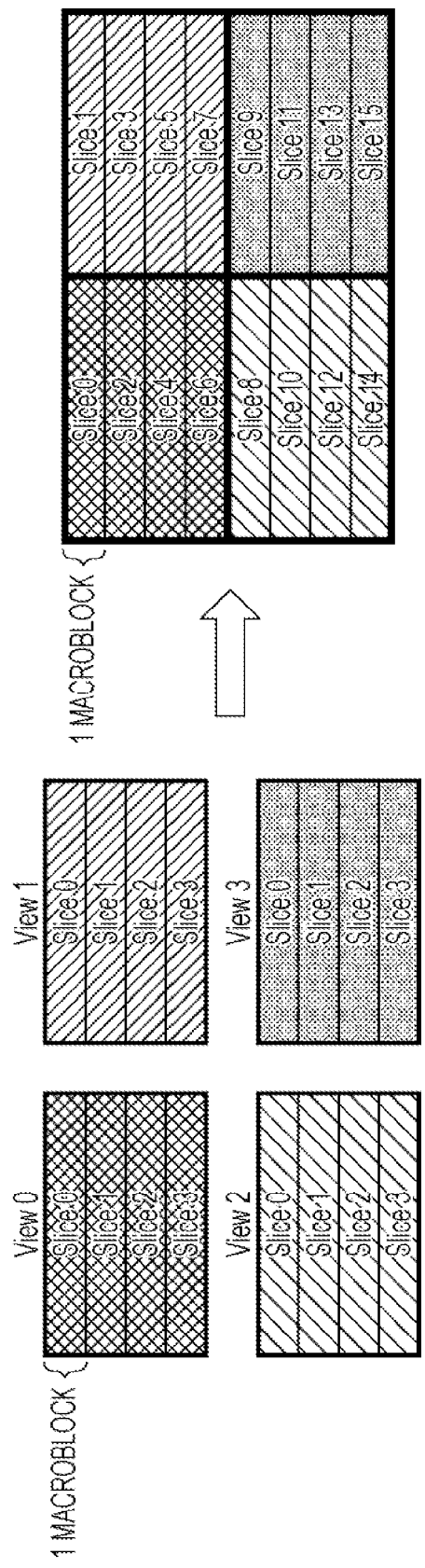
FIG. 5 illustrates generation of a frame-based encoded stream of a multiple-video image.

FIG. 5 illustrates how the combining unit 34 in FIG. 4 generates a frame-based encoded stream of a multiple-video image.

Note that the example of FIG. 5 shows that the combining unit 34 generates a frame-based encoded stream of a multiple-video image with the 0th to 3rd videos (i.e., View 0 to View 3) arranged at the upper left, upper right, lower left, and lower right, respectively.

As shown in FIG. 5, there are one or more pixels having a predetermined pixel value (0 in this example) in surrounding areas of videos, which are associated with encoded streams input to the combining unit 34. Each of the encoded streams input to the combining unit 34 is a stream encoded by an advanced video coding (AVC) method in which macroblocks, which are coding units, in each horizontal line are regarded as a slice, and the slice does not refer to the outside of the screen, but refers to a frame one frame before the current frame in a coding order. The frame referred to is called a reference frame in intra coding. In the example of FIG. 5, each video has four macroblocks in a vertical direction, and accordingly the number of slices in each video is four.

The combining unit 34 reorders slices in the respective encoded streams of the 0th to 3rd videos to be displayed in the input encoded streams and combines the encoded streams of the 0th to 3rd videos, thereby generating a frame-based encoded stream of a multiple-video image.

Specifically, the combining unit 34 arranges the 0th slice of the 0th video as the 0th slice of the combined encoded stream, while arranging the 0th slice of the 1st video as the 1st slice of the combined encoded stream. Thereafter, the slices of the 0th video and the slices of the 1st video are alternately arranged, and the last slice of the 1st video is arranged so as to be the 7th slice in the combined encoded stream.

Then, the combining unit 34 arranges the 0th slice of the 2nd video as the 8th slice of the combined encoded stream, while arranging the 0th slice of the 3rd video as the 9th slice of the combined encoded stream. Thereafter, the slices of the 2nd video and the slices of the 3rd video are alternately arranged, and the last slice of the 3rd video is arranged so as to be the 15th slice of the combined encoded stream.

Since the encoded streams input to the combining unit 34 are encoded streams with the macroblocks on each horizontal line encoded as a slice, there is no dependence between macroblocks arranged at vertically different positions. Therefore, decoding can be properly performed even if the slices are decoded in a different order. Thus, the combining unit 34 can generate a frame-based encoded stream of a multiple-video image by only reordering the slices of the encoded streams of the respective videos.

[Description on Insertion Stream]

Figure 6:
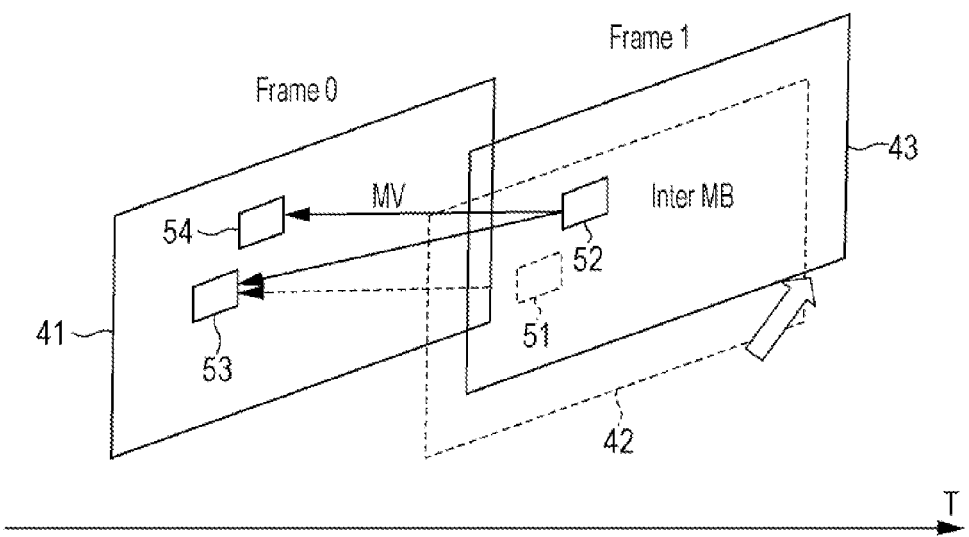
FIG. 6 illustrates a multiple-video image when a view area is moved.

FIG. 6 illustrates a multiple-video image when a view area is moved.

In FIG. 6, the horizontal axis represents time (T). This is the same in FIG. 7 as will be described later.

As shown in FIG. 6, when a view area of the 1st frame (Frame 1) is positioned at the bottom left with respect to a view area of the 0th frame (Frame 0) in the coding order, or, in other words, when a view area of the 0th frame moves in a direction toward the bottom left, the position of the videos in the multiple-video image moves in a direction toward the top right on the screen. That is, a video 43 in the multiple-video image of the 1st frame, which is associated with the multiple-video image 41 of the 0th frame, is positioned at the top right with respect to the multiple-video image 41 on the screen.

In this case, if the motion vector (MV) of a macroblock (Inter MB) 52 in the video 43, which is inter-coded with reference to the multiple-video image 41, is not changed, the reference block of the macroblock 52 is changed to a block positioned at the top right with respect to a block 53 to which the macroblock 52 is supposed to refer.

In short, the macroblock 52 corresponds to a macroblock 51 of a multiple-video image 42 of the 1st frame when the view area is not moved. Therefore, it is necessary for the motion vector of the macroblock 52 to point to the block 53 that is a reference block of the macroblock 51. However, if the motion vector of the macroblock 51 is applied to the motion vector of the macroblock 52, the macroblock 52 refers to a block 54, as the reference block, that is positioned at the top right with respect to the block 53 in the multiple-video image 41 because the macroblock 52 is positioned at the top right with respect to the macroblock 51 on the screen. As a result, the macroblock 52 is not properly decoded.

To achieve proper decoding even when the view area is moved, it is necessary to shift the position pointed at by the motion vector of the inter-coded macroblock in the direction in which the view area has moved by an amount of movement of the view area. However, decoding the multiple-video image once to change the motion vector of the multiple-video image and recording the decoded multiple-video image increase the processing load, thereby making it difficult to deliver the combined stream in real time. In addition, recoding of the multiple-video image may deteriorate the image quality.

Therefore, the distribution server 11 inserts an insertion stream in order to shift the position pointed at by the motion vector of the inter-coded macroblock in the direction in which the view area has moved by an amount of movement of the view area.

More specifically, the distribution server 11 generates an insertion stream in which all macroblocks of an insertion video are replaced with skip macroblocks with a motion vector indicating the direction in which and the amount by which the view area has moved, and inserts the insertion stream before the encoded stream of the multiple-video image in which the view area has moved.

Figure 7:
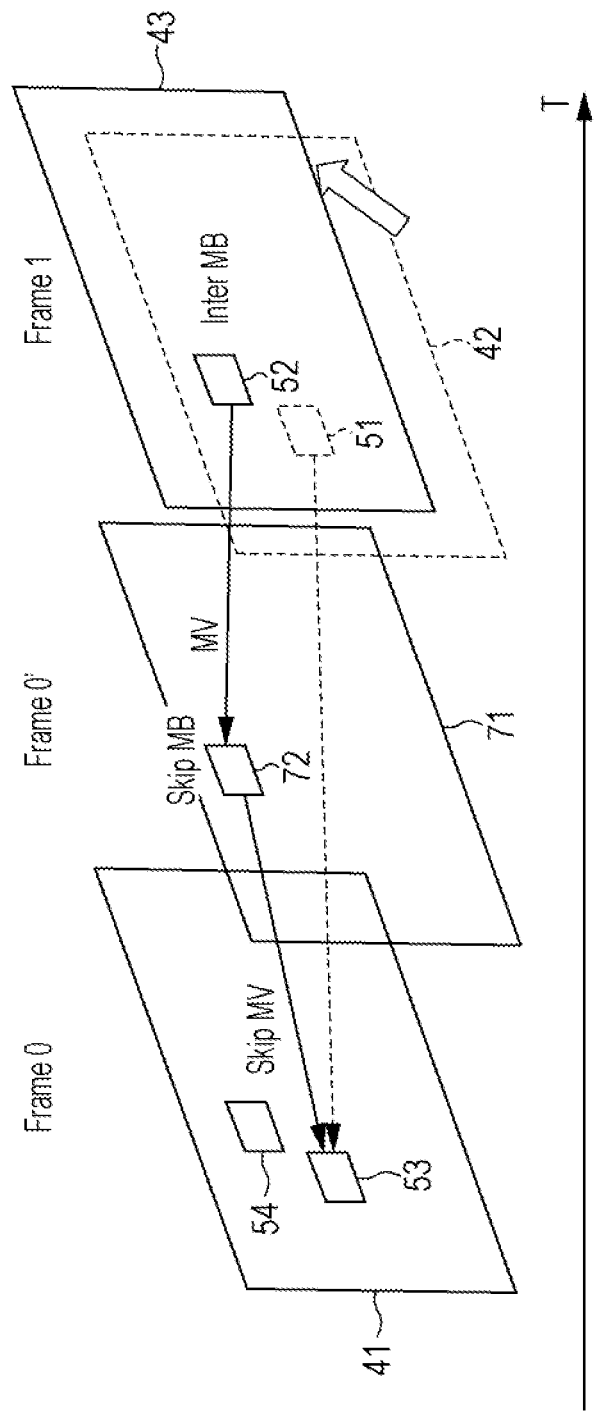
FIG. 7 illustrates an insertion stream.

For example, when the view area is moved in a direction toward the bottom left as shown in FIG. 6, the distribution server 11 generates an insertion stream in which all macroblocks are replaced with skip macroblocks with a motion vector pointing in the direction toward the bottom left as shown in FIG. 7. Thus, the insertion video image 71 corresponds to the multiple-video image 41 that is positioned further toward the bottom left than the insertion video image on the screen. In short, the insertion video image 71 corresponds to the multiple-video image 41 with the view area having moved in the direction toward the bottom left.

The insertion stream is inserted as an encoded stream of the 0'th frame (Frame 0') before the encoded stream of the multiple-video image of the 1st frame in which the view area has moved. As a result, the multiple-video image of the 1st frame is decoded with reference to the insertion video image 71, which is one frame before the multiple-video image of the 1st frame, but not the multiple-video image 41.

As described above, for example, the macroblock 52 is decoded with reference to a block 72 of the insertion video image 71. The block 72 is in a position corresponding to the block 54 on the screen, and the block 54 is positioned at the top right with respect to the block 53 to which the macroblock 51 refers. Also, the block 72 corresponds to the block 53 that is positioned further toward the bottom left than the block 72 on the screen. Therefore, the macroblock 52 is decoded with reference to the block 53 that is a reference block of the corresponding macroblock 51.

As described above, the distribution server 11 shifts the position pointed at by the motion vector of the macroblock 52 in the direction in which the view area has moved by an amount of movement of the view area by inserting the insertion stream without recoding.

Figure 8:
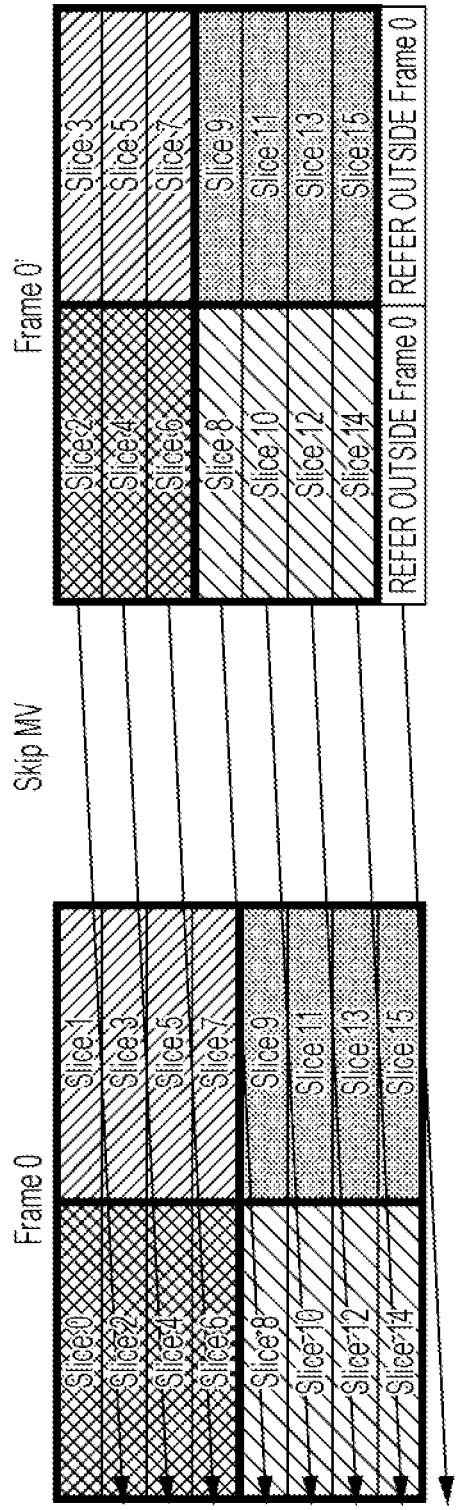
FIG. 8 illustrates an insertion video image in a case where slice data of an insertion stream is not updated.
Figure 9:
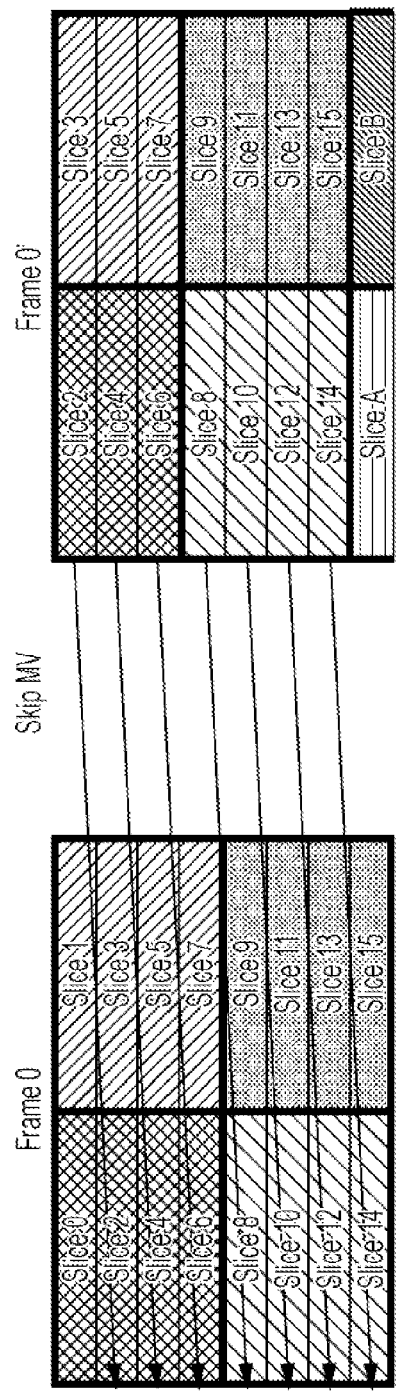
FIG. 9 illustrates an insertion video image in a case where slice data of an insertion stream is updated.

With reference to FIGS. 8 and 9, a description will be made about updating of slice data of an insertion stream.

FIG. 8 illustrates an insertion video image in a case where slice data of an insertion stream is not updated.

In the example of FIG. 8, the frame-based encoded stream of the multiple-video image generated in FIG. 5 is an encoded stream of a multiple-video image of the 0th frame. Next to the 0th frame, an insertion stream is inserted as an encoded stream of the 0'th frame and all macroblocks of the insertion stream are replaced with skip macroblocks with a motion vector that indicates a downward direction and an amount of movement equivalent to the size of one macroblock. These are the same in FIG. 9 as will be described later.

When slice data of the insertion stream is not updated as shown in FIG. 8, the insertion video image of the insertion stream becomes a multiple-video image with videos in the multiple-video image of the 0th frame moved upward by just one slice. In short, the macroblocks of the insertion stream are skip macroblocks with a motion vector pointing in a downward direction by just one slice.

Therefore, the slices of the insertion stream are decoded with reference to the slices of the multiple-video image of the 0th frame positioned one macroblock lower than the slices of the insertion stream on the screen. Therefore, the upper part of the decoded video image of the insertion stream is composed of the 2nd to 15th slices of the multiple-video image of the 0th frame.

On the other hand, there are no slices of the multiple-video image of the 0th frame, which are supposed to be positioned one macroblock lower than the lowermost slices of the insertion video image. Therefore, the slices of the insertion video image refer to pixels that are closest to their reference within the screen. In this example, the pixels are in the lowermost part of the 14th and 15th slices, which are the lowermost slices of the multiple-video image of the 0th frame, and have a predetermined pixel value (0 in this example). As a result, the pixels of the slices at the lowermost part of the decoded video image of the insertion stream have a predetermined pixel value (0 in this example).

Since one or more pixels in surrounding areas of the videos making up the multiple-video image have a predetermined pixel value, the pixel value of the decoded video image of the insertion stream that is decoded with reference to the outside of the screen can be set to the predetermined value.

In contrast, if one or more pixels in the surrounding areas of the videos making up the multiple-video image do not have a predetermined pixel value, the decoded video image of the insertion stream, which is supposed to be decoded with reference to pixels outside the screen, refers to pixels inside the screen that are closest to the reference, resulting in corruption of the decoded video image of the insertion stream.

As shown in FIG. 8, even if the distribution server 11 does not update the slice data of the insertion stream, the decoded video image of the insertion stream is prevented from becoming corrupted and is displayed with high quality.

However, if the amount of movement of the view area is equivalent to n (n=integer) slices (e.g., 16×n pixels) and the view area moves in a vertical direction, this embodiment is configured to display a video that is supposed to be displayed rather than a video in a fixed color (black in this example). This can further improve the quality of the decoded video image of the insertion stream.

FIG. 9 illustrates an insertion video image in a case where slice data of an insertion stream is updated.

When a view area moves by an amount of n slices in a vertical direction, slice data of n slices from the movement direction of an insertion video image are updated to intra-coded slice data of n slices from the opposite direction to the movement direction of videos that are to be displayed at the position of the n slices. In this case, slices that have no reference slices to which the slices of the insertion video refer in the multiple-video image are replaced with intra-coded slices of videos to be displayed at positions at which the slices are positioned.

For example, as shown in FIG. 9, when the view area moves by an amount of one slice in a downward direction, slice data of one slice from the downward direction of the insertion video image is updated to intra-coded slice data of one slice (Slice A or Slice B) from the upward direction of videos that are to be displayed at the position of the one slice.

Accordingly, the lowermost slices of the insertion video image are decoded without referring to the 0th frame of the multiple-video image, and the decoded video image of the lowermost slices becomes a video image that are supposed to be displayed at the position of the slices. As a result, the image quality of the decoded video image of the insertion stream is improved.

[Description on Insertion of Insertion Stream]

Figure 10:
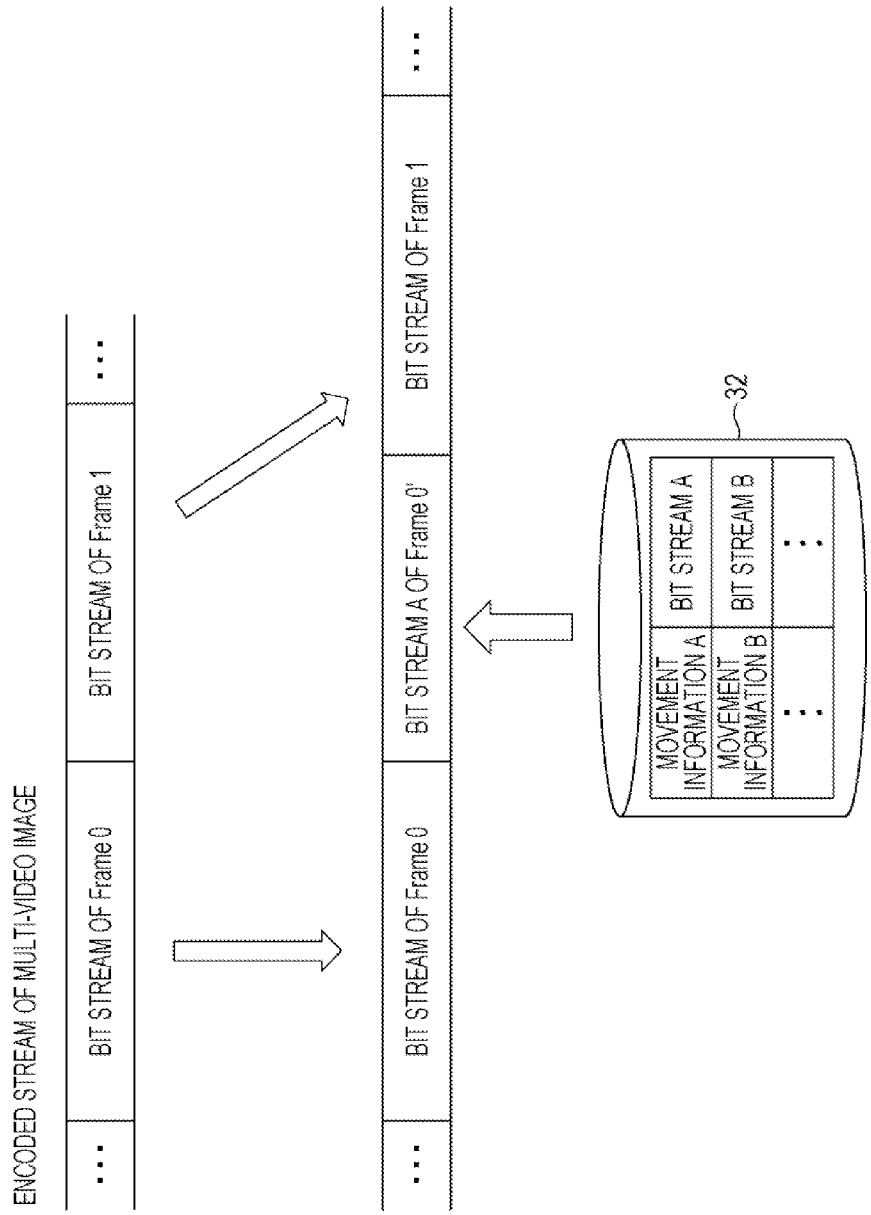
FIG. 10 illustrates how to insert an insertion stream.

FIG. 10 illustrates how the insertion unit 35 in FIG. 4 inserts an insertion stream.

As shown in FIG. 10, a storage unit 32 stores (bit streams of) insertion streams associated with movement information. Specifically, the storage unit 32 stores (a bit stream of) an insertion stream with all macroblocks included replaced with skip macroblocks with a motion vector indicating the movement information according to the movement information.

The read unit 33 reads out (the bit stream of) the insertion stream associated with the movement information supplied from the receiving unit 31. Then, the insertion unit 35 updates the slice data of (the bit stream of) the read insertion stream on the basis of the movement information, and inserts the updated insertion stream into (a bit stream of) a frame-based encoded stream of a multiple-video image supplied from the combining unit 34.

For example, as shown in FIG. 10, if movement information supplied from the receiving unit 31 is movement information A and does not point out an amount of movement equivalent to n slices and a vertical direction, (a bit stream of) an insertion stream A is inserted as it is in between (the bit streams of) the encoded streams of the multiple-video image of the 0th and 1st frames.

As described above, since the storage unit 32 stores an insertion stream associated with movement information, the distribution server 11 can insert the insertion stream with much lighter processing load in comparison with the case where the distribution server 11 generates an insertion stream associated with movement information every time the distribution server 11 receives the movement information.

At the time of insertion of the insertion stream, the slice header of the insertion stream is changed. Specifically, frame_num, pic_order_cnt_lsb, delta_pic_order_cnt_bottom, delta_pic_order_cnt[0], and delta_pic_order_cnt[1], which are included in a slice header of an insertion stream, are made the same as those in a slice header of the immediately following frame in the coding order of frames of the insertion stream.

frame_num is a frame identifier, and pic_order_cnt_lsb, delta_pic_order_cnt_bottom, delta_pic_order_cnt[0], and delta_pic_order_cnt[1] are information to be used to determine a picture order count (POC).

During insertion of the insertion stream, the values of frame_num, pic_order_cnt_lsb, delta_pic_order_cnt_bottom, delta_pic_order_cnt[0], and delta_pic_order_cnt[1] of all frames from the frame of the insertion stream to an IDR picture are increased by a value equivalent to the frame 0'.

Furthermore, updating the slice data of the insertion stream involves a change of data other than the slice data of the insertion stream when the intra-coded slice data to be used for the update is slice data of the IDR picture.

Specifically, nal_unit_type, which indicates the type of a network abstraction layer (NAL) unit of the slice data to be used for the update, is changed from 5 indicating that the slice data is slice data of the IDR picture to 1 indicating that the slice data is slice data of a picture other than the IDR picture. In addition, idr_pic_id, which is an identifier of the IDR picture and included in the slice header of the slice data to be used for the update, is deleted.

When nal_unit_type of the slice data to be used for the update is 5 and nal_ref_idc is not 0, no_output_of_prior_pics_flag and long_term_reference_flag included in the slice header are deleted and adaptive_ref_pic_marking_mode_flag is changed to 0.

In other words, when the slice data to be used for the update is slice data of a reference picture or the like, no_output_of_prior_pics_flag and long_term_reference_flag are deleted and adaptive_ref_pic_marking_mode_flag is changed to 0.

no_output_of_prior_pics_flag is a flag specifying how the pictures decoded prior to the IDR picture are treated after decoding of the IDR picture. long_term_reference_flag is a flag specifying whether the IDR picture is used as a long-term reference picture. adaptive_ref_pic_marking_mode_flag is a flag to be set to use memory management control operation (MMCO) and is set to 0 when MMCO is not used.

[Description on Update of Frame-Based Encoded Stream of Multiple-Video Image]

FIGS. 11A, 11B, 11C illustrate how the combining unit 34 in FIG. 4 updates a frame-based encoded stream of a multiple-video image.

In the example shown in FIGS. 11A to 11C, the encoded stream of a multiple-video image of the 0th frame shown in FIG. 11A corresponds to the frame-based encoded stream of the multiple-video image in FIG. 5. As shown in FIG. 11A, the 2nd slice of the multiple-video image of the 1st frame refers to the 0th slice of the 0th frame which is one frame previous to the 1st frame.

When a view area is moved downwardly by one slice between the 0th and 1st frames in such a multiple-video image, an insertion stream is generated as described with reference to FIG. 9 and is inserted as an encoded stream of the 0'th frame as shown in FIG. 11B.

Then, an encoded stream of a multiple-video image of the 1st frame is generated so as to contain slices that correspond to the 2nd to 15th slices of the multiple-video image of the 0th frame in an upper part of the multiple-video image of the 1st frame.

Specifically, an encoded stream of a multiple-video image composed of the 1st to 3rd slices of the 1st and 2nd videos and the 0th to 3rd slices of the 3rd and 4th videos is generated as the encoded stream of the multiple-video image of the 1st frame.

However, the 0th slice of the multiple-video image of the 1st frame (corresponding to the 2nd slice of the multiple-video image of the 0th frame) refers to a slice of the 0'th frame, which is positioned one slice upper than the 0th slice, namely the outside of the screen. Consequently, proper decoding is not performed.

For proper decoding, the combining unit 34 replaces all the macroblocks, which are in the slices of the 1st video in the multiple-video image of the 1st frame and refer to outside the screen, with skip macroblocks with a motion vector of 0 as shown in FIG. 11C. This properly decodes the 1st video in the multiple-video image of the 1st frame and makes the 1st video in the multiple-video image of the 1st frame the same as the 1st video in the multiple-video image of the 0'th frame. Consequently, display of the 1st video is stopped.

In the example of FIGS. 11A to 11C, the 2nd video also contains a slice that refers to a slice outside the screen as with the case of the 1st video, and therefore display of the 2nd video is also stopped.

In addition, if an area other than the 1st to 4th videos in the multiple-video image of the 1st frame is not an area containing all slices of videos to be displayed, the combining unit 34 replaces all the macroblocks of the area with skip macroblocks with a motion vector of 0 as shown in FIG. 11C. As a result, display of the area other than the 1st to 4th videos in the multiple-video image of the 1st frame is stopped.

[Description on Processing by Distribution Server]

Figure 12:
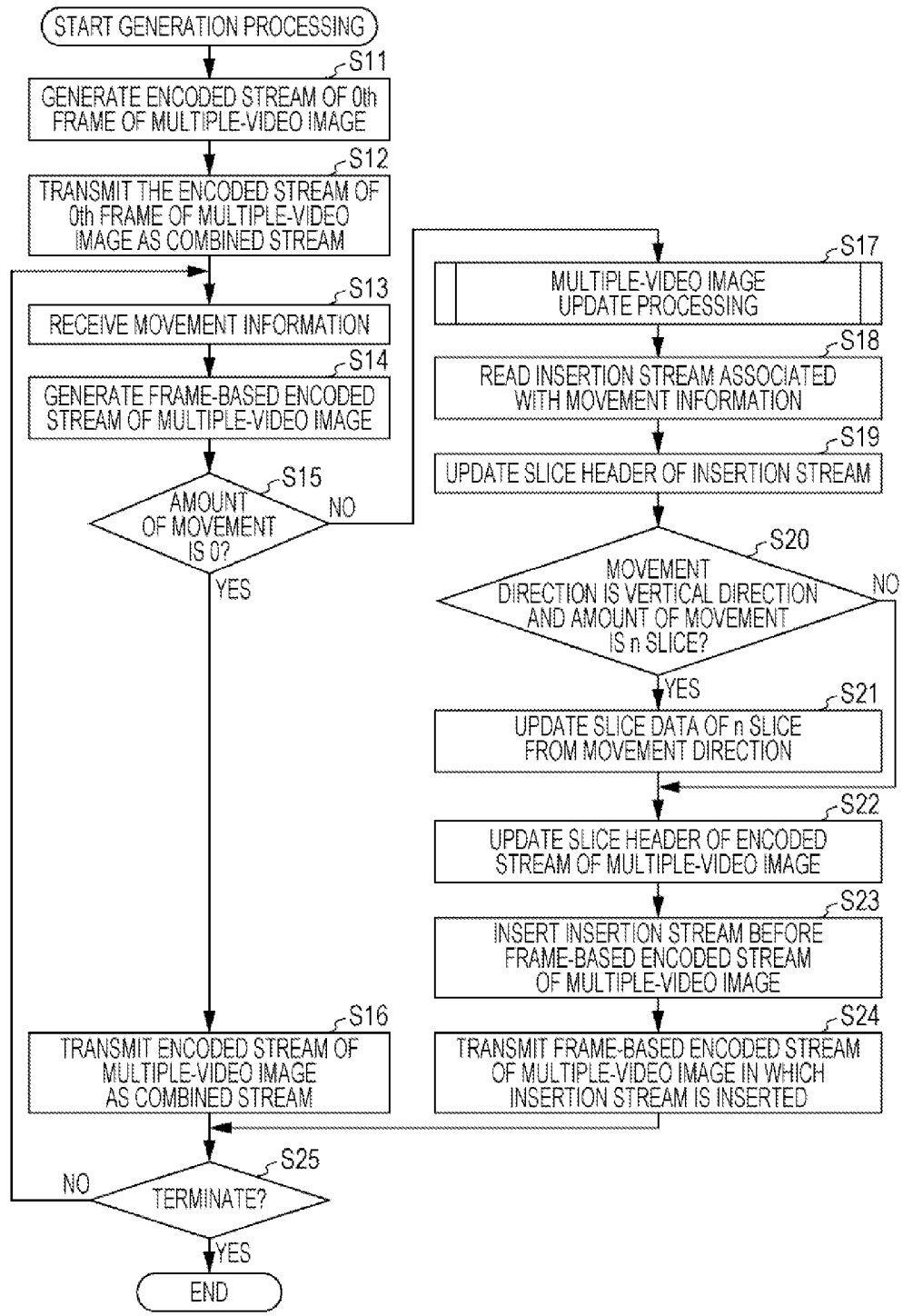
FIG. 12 is a flowchart illustrating how the distribution server in FIG. 4 performs generation processing.

FIG. 12 is a flow chart illustrating how the distribution server 11 in FIG. 4 performs generation processing.

In step S11 in FIG. 12, a combining unit 34 selects encoded streams equivalent to one frame of each of a plurality of videos to be displayed from encoded streams of a plurality of videos input from outside sources and combines the selected streams to generate an encoded stream of the 0th frame of the multiple-video image. The combining unit 34 supplies the encoded stream of the 0th frame of the multiple-video image to a transmission unit 36 via an insertion unit 35.

In step S12, the transmission unit 36 transmits the encoded stream of the 0th frame of the multiple-video image, which is supplied from the insertion unit 35, as a combined stream to the receiving device 13 via the network 12 shown in FIG. 3.

In step S13, the receiving unit 31 receives movement information transmitted from the receiving device 13 via the network 12 and supplies the movement information to a read unit 33, the combining unit 34, and the insertion unit 35.

In step S14, the combining unit 34 selects encoded streams equivalent to one frame of each of a plurality of videos to be displayed from encoded streams of a plurality of videos input from outside sources on the basis of the history of the movement information and combines the selected streams to generate a frame-based encoded stream of a multiple-video image. The combining unit 34 supplies the encoded stream to the insertion unit 35.

In step S15, the read unit 33 determines whether the amount of movement, which is indicated by the movement information supplied from the receiving unit 31, is 0. If it is determined that the amount of movement is 0 in step S15, the insertion unit 35 supplies the frame-based encoded stream of the multiple-video image supplied from the combining unit 34 to the transmission unit 36.

In step S16, the transmission unit 36 transmits the frame-based encoded stream of the multiple-video image supplied from the combining unit 34 as a combined stream to the receiving device 13 via the network 12 and the processing goes to step S25.

On the other hand, if it is determined that the amount of movement is not 0 in step S15, the combining unit 34 performs in step S17 multiple-video image update processing to update the frame-based encoded stream of the multiple-video image generated in step S14. A detailed description will be given about the multiple-video image update processing with reference to FIG. 13 described later.

In step S18, the read unit 33 reads out an insertion stream associated with the movement information from the storage unit 32 on the basis of the movement information supplied from the receiving unit 31 and supplies the insertion stream to the insertion unit 35.

In step S19, the insertion unit 35 updates the slice header of the insertion stream with the use of the slice header of the frame-based encoded stream of the multiple-video image supplied from the combining unit 34. Specifically, the insertion unit 35 makes frame_num, pic_order_cnt_lsb, delta_pic_order_cnt_bottom, delta_pic_order_cnt[0], and delta_pic_order_cnt[1], which are contained in the slice header of the insertion stream, the same as those in the slice header of the encoded stream supplied from the combining unit 34.

In step S20, the insertion unit 35 determines whether the movement information supplied from the receiving unit 31 indicates that the movement direction is a vertical direction and the amount of movement is n slice.

If it is determined that the movement direction is a vertical direction and the amount of movement is n slice in step S20, the processing goes to step S21. In step S21, the insertion unit 35 updates slice data of n slice from the movement direction of an insertion video image to intra-coded slice data of n slices from the opposite direction to the movement direction of videos that are to be displayed at the position of the n slices.

The slice data used for the update is selected from slice data of encoded streams of a plurality of videos input from outside sources. If the slice data used for the update is slice data of an IDR picture, the insertion unit 35 changes nal_unit_type and idr_pic_id of the insertion stream. If nal_ref_idc is not 0, the insertion unit 35 changes also no_output_of_prior_pics_flag, long_term_reference_flag, and adaptive_ref_pic_marking_mode_flag. Subsequent to the processing in step S21, the processing goes to step S22.

On the other hand, if it is determined that the movement direction is not a vertical direction or the amount of movement is not n slice in step S20, the processing skips step S21 and goes to step S22.

In step S22, the insertion unit 35 updates the slice header of the encoded stream of the multiple-video image supplied from the combining unit 34. Specifically, the insertion unit 35 increases the value of frame_num, pic_order_cnt_lsb, delta_pic_order_cnt_bottom, delta_pic_order_cnt[0], and delta_pic_order_cnt[1], which are contained in the slice header of the encoded stream of the multiple-video image, by the number of frames of insertion stream to be inserted between an IDR picture and a picture of the multiple-video image.

In step S23, the insertion unit 35 inserts the insertion stream before the frame-based encoded stream of the multiple-video image with the slice header updated in step S22. Thus, the insertion stream is inserted in the frame-based encoded stream of the multiple-video image. In addition, the insertion unit 35 supplies the frame-based encoded stream of the multiple-video image with the insertion stream inserted therein to the transmission unit 36.

In step S24, the transmission unit 36 transmits the frame-based encoded stream of the multiple-video image in which the insertion stream supplied from the insertion unit 35 is inserted, as a combined stream, to the receiving device 13 via the network 12, and the processing goes to step S25.

In step S25, the distribution server 11 determines whether to terminate the generation processing in response to a user's instruction or the like. If the distribution server 11 determines not to terminate the generation processing in step S25, the processing returns to step S13 and the processing from step S13 to step S25 is repeated until the generation processing is terminated.

If the distribution server 11 determines to terminate the generation processing in step S25, the processing is terminated.

FIG. 13 is a flowchart that details multiple-video image update processing in step S17 in FIG. 12.

In step S41 in FIG. 13, the combining unit 34 selects a video that has not been processed yet from videos making up a multiple-video image as a target video to be processed. In step S42, the combining unit 34 determines whether all slices of the target video are present in the multiple-video image.

If it is determined that all slices of the target video are present in the multiple-video image in step S42, it is then determined whether slices to be referred by the slices of the target video are present outside the insertion video image in step S43.

If it is determined that the slices to be referred by the slices of the target video are present outside the insertion video image in step S43, the processing goes to step S44.

On the other hand, if it is determined that all the slices of the target video are not present in the multiple-video image in step S42, the processing goes to step S44.

In step S44, the combining unit 34 changes all macroblocks of the target video in the frame-based encoded stream of the multiple-video image generated in step S14 of FIG. 12 to skip macroblocks with a motion vector of 0. Then, the processing goes to step S45.

On the other hand, if it is determined that slices to be referred by the slices of the target video are not present outside the insertion video image in step S43, the processing skips step S44 and goes to step S45.

In step S45, the combining unit 34 determines whether all videos making up the multiple-video image are selected as target videos to be processed. If it is determined that all the videos making up the multiple-video image are not selected as target videos to be processed in step S45, the processing returns to step S41 and repeats step S41 to step S45 until all the videos are selected as target videos to be processed.

If it is determined that all the videos making up the multiple-video image are selected as target videos to be processed in step S45, the processing returns to step S17 and goes to step S18 in FIG. 12.

As described above, when a view area of a multiple-video image is moved, the distribution server 11 inserts an insertion stream in an encoded stream of the multiple-video image, thereby eliminating the necessity to change the motion vector of the encoded stream of the multiple-video image. Accordingly, the distribution server 11 can generate a combined stream without recoding when the view area of the multiple-video image is moved.

Thus, processing load caused by movement of the view area of the multiple-video image is reduced. As a result, even if the distribution server 11 has a low processing capacity, the distribution server 11 can generate a combined stream that is supposed to appear after the view area of the multiple-video image has moved. In addition, the quality degradation of the multiple-video image caused by recoding can be prevented.

[Description on Computer to which the Present Disclosure is Applied]

The aforementioned series of processes performed by the distribution server 11 can be implemented not only by hardware but also by software. When the series of processes is implemented by software, software programs are installed in a computer. The computer used herein may be a computer incorporated in hardware for specific purposes or, for example, a general-purpose personal computer that can perform various functions by installing various programs thereon.

FIG. 14 is a block diagram showing an exemplary hardware configuration of a computer that executes the aforementioned series of processes performed by the distribution server 11 with programs.

In the computer, a central processing unit (CPU) 201, a read only memory (ROM) 202, and a random access memory (RAM) 203 are interconnected by a bus 204.

The bus 204 is further connected with an input-output interface 205. The input-output interface 205 is connected with an input section 206, an output section 207, a storage section 208, a communicating section 209, and a drive 210.

The input section 206 includes a keyboard, a mouse, a microphone, etc. The output section 207 includes a display, a speaker, etc. The storage section 208 includes a hard disk, a nonvolatile memory, etc. The communication section 209 includes a network interface, etc. The drive 210 drives a removable medium 211, such as a magnetic disk, an optical disc, a magneto-optical disc, or a semiconductor memory, etc.

In the computer configured as described above, for example, the CPU 201 loads a program stored in the storage section 208 into the RAM 203 via the input-output interface 205 and the bus 204, and then executes the program. Thus, the series of processes described above is performed.

It is possible to record the program to be executed on the computer (CPU 201) on a removable medium 211, such as a package medium and to provide the removable medium 211. In addition, the program can be provided via a wired or wireless transmission medium such as a local area network, the Internet, digital satellite broadcasting or the like.

The program can be installed from the removable medium 211 loaded into the drive 210 to the storage section 208 of the computer through the input/output interface 205. The program can be also installed into the storage section 208 from the communication section 209 that receives the program through a wired or wireless transmission medium. In addition, the program can be preinstalled in the ROM 202 or the storage section 208.

The programs executed by the computer may be programs that are processed in time series in accordance with the sequence described in this specification. Alternatively, the programs may be programs to be executed in parallel or at necessary timing, such as at the time of being invoked, or the like.

The embodiments of the present disclosure are not limited to the foregoing embodiments, and various changes can be made without departing from the spirit of the present disclosure.

For example, in the present disclosure, it is possible to employ a cloud-computing configuration in which one function is shared and processed in cooperation by a plurality of devices through a network.

It is also possible to execute each step in the foregoing flowchart by a single apparatus or to share the steps among a plurality of apparatuses.

Furthermore, a single step may include a plurality of processes that can be executed by a single apparatus or can be shared by a plurality of apparatuses.

All macroblocks of the insertion stream can be changed into skip macroblocks with a motion vector indicating movement information irrespective of movement information of a view area. In addition, the coding method of the encoded stream of videos may be a high efficiency video coding (HEVC) method. In this case, the unit of coding is a coding unit (CU).

The present disclosure can be configured as follows.

[1] A video processing apparatus includes a combining unit that combines encoded streams of a plurality of videos to generate an encoded stream of a multiple-video image composed of the videos, each encoded stream of each video having coding units in each horizontal line that are encoded as a slice, and an insertion unit that inserts an insertion stream into the encoded stream of the multiple-video image generated by the combining unit when a view area of the multiple-video image is moved, the insertion stream being an encoded stream in which all the coding units in the multiple-video image are replaced with skip macroblocks with a motion vector indicating a direction and an amount of movement of the view area.

[2] The video processing apparatus according to [1], wherein one or more pixels in surrounding areas in the videos have a predetermined pixel value.

[3] The video processing apparatus according to [1] or [2], wherein the insertion unit replaces a slice that is in the insertion stream and has no reference slice in the multiple-video image with an intra-coded slice of a video to be displayed at a position at which the slice is positioned.

[4] The video processing apparatus according to [3], wherein when the direction of movement of the view area is a vertical direction and the amount of movement of the view area is an integral multiple of a slice, the insertion unit replaces a slice that is in the insertion stream and has no reference slice in the multiple-video image with an intra-coded slice of a video to be displayed at a position at which the slice is positioned.

[5] The video processing apparatus according to any of [1] to [4], wherein the insertion unit generates a slice header of the insertion stream on the basis of a slice header of the encoded stream, which is placed immediately after the insertion stream, of the multiple-video image.

[6] The video processing apparatus according to any of [1] to [5], wherein when the reference slice of a slice of the video in a multiple-video image associated with the encoded stream of the multiple-video image is present outside a multiple-video image associated with the insertion stream, the combining unit replaces all the coding units in the video with skip macroblocks with a motion vector of 0.

[7] The video processing apparatus according to any of [1] to [6], wherein when all the slices of the video are not present in a multiple-video image associated with the encoded stream of the multiple-video image, the combining unit replaces all the coding units of the video with skip macroblocks with a motion vector of 0.

[8] A video processing method performed by a video processing apparatus, includes combining encoded streams of a plurality of videos to generate an encoded stream of a multiple-video image composed of the videos, each encoded stream of each video having coding units in each horizontal line that are encoded as a slice, and inserting an insertion stream in the encoded stream of the multiple-video image generated by the combining process when a view area of the multiple-video image is moved, the insertion stream being an encoded stream in which all the coding units in the multiple-video image are replaced with skip macroblocks with a motion vector indicating a direction and an amount of movement of the view area.

What is claimed is:
1. A video processing apparatus comprising:
 a combining unit that combines encoded streams of a plurality of videos to generate an encoded stream of a multiple-video image composed of the videos, each encoded stream of each video having coding units in each horizontal line that are encoded as a slice; and an insertion unit that inserts an insertion stream into the encoded stream of the multiple-video image generated by the combining unit when a view area of the multiple-video image is moved, the insertion stream being an encoded stream in which all the coding units in the multiple-video image are replaced with skip macroblocks with a motion vector indicating a direction and an amount of movement of the view area.

2. The video processing apparatus according to claim 1, wherein
one or more pixels in surrounding areas in the videos have a predetermined pixel value.

3. The video processing apparatus according to claim 1, wherein
the insertion unit replaces a slice that is in the insertion stream and has no reference slice in the multiple-video image with an intra-coded slice of a video to be displayed at a position at which the slice is positioned.

4. The video processing apparatus according to claim 3, wherein
when the direction of movement of the view area is a vertical direction and the amount of movement of the view area is an integral multiple of a slice, the insertion unit replaces a slice that is in the insertion stream and has no reference slice in the multiple-video image with an intra-coded slice of a video to be displayed at a position at which the slice is positioned.

5. The video processing apparatus according to claim 1, wherein
the insertion unit generates a slice header of the insertion stream on the basis of a slice header of the encoded stream, which is placed immediately after the insertion stream, of the multiple-video image.

6. The video processing apparatus according to claim 1, wherein
when the reference slice of a slice of the video in a multiple-video image associated with the encoded stream of the multiple-video image is present outside a multiple-video image associated with the insertion stream, the combining unit replaces all the coding units in the video with skip macroblocks with a motion vector of 0.

7. The video processing apparatus according to claim 1, wherein
when all the slices of the video are not present in a multiple-video image associated with the encoded stream of the multiple-video image, the combining unit replaces all the coding units of the video with skip macroblocks with a motion vector of 0.

8. A video processing method performed by a video processing apparatus, comprising:
combining encoded streams of a plurality of videos to generate an encoded stream of a multiple-video image composed of the videos, each encoded stream of each video having coding units in each horizontal line that are encoded as a slice; and inserting an insertion stream into the encoded stream of the multiple-video image generated by the combining process when a view area of the multiple-video image is moved, the insertion stream being an encoded stream in which all the coding units in the multiple-video image are replaced with skip macroblocks with a motion vector indicating a direction and an amount of movement of the view area.

\* \* \* \* \*

UNITED STATES PATENT AND TRADEMARK OFFICE
CERTIFICATE OF CORRECTION

| | | |
|---|---|---|
| PATENT NO. | : 8,817,881 B1 | Page 1 of 1 |
| APPLICATION NO. | : 14/187647 | |
| DATED | : August 26, 2014 | |
| INVENTOR(S) | : Koji Yano, Yuji Fujimoto and Junichiro Enoki | |

It is certified that error appears in the above-identified patent and that said Letters Patent is hereby corrected as shown below:

Title Page, below Item (22) insert:
--(30) Foreign Application Priority Data
Mar. 8, 2013 (JP)..........................................2013-046836--

Signed and Sealed this
Nineteenth Day of May, 2015

Michelle K. Lee
*Director of the United States Patent and Trademark Office*